G. J. STILLMAN.
RESILIENT TIRE.
APPLICATION FILED FEB. 8, 1922.

1,437,275.

Patented Nov. 28, 1922.

Inventor
George J. Stillman

By L. B. James
Attorney

Patented Nov. 28, 1922.

1,437,275

UNITED STATES PATENT OFFICE.

GEORGE J. STILLMAN, OF JERSEY CITY, NEW JERSEY.

RESILIENT TIRE.

Application filed February 8, 1922. Serial No. 534,903.

*To all whom it may concern:*

Be it known that I, GEORGE J. STILLMAN, a citizen of the United States, residing at Jersey City, in the county of Hudson and State of New Jersey, have invented new and useful Improvements in Resilient Tires, of which the following is a specification.

This invention relates to vehicle tires, the general object of the invention being to provide spring means for taking the place of the pneumatic tube so as to eliminate trouble from punctures and blowouts while securing the cushion effect of the pneumatic tire.

Another object of the invention is to provide plates of slightly flexible metal which are acted upon by the spring means.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
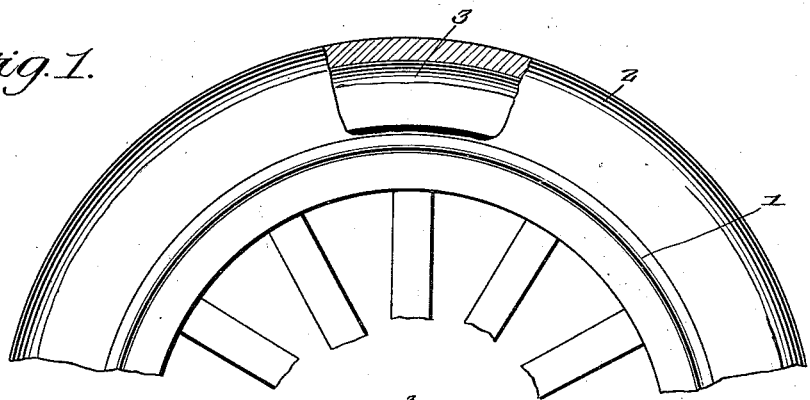
Figure 1 is a fragmentary side view partly broken away.
Figure 2:
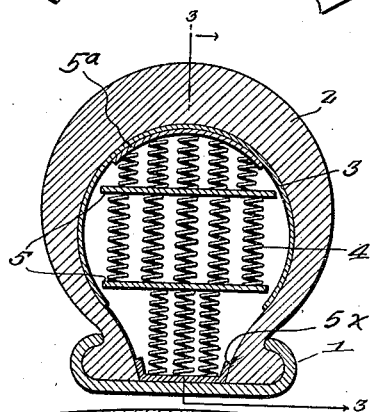
Figure 2 is an enlarged transverse sectional view.
Figure 3:
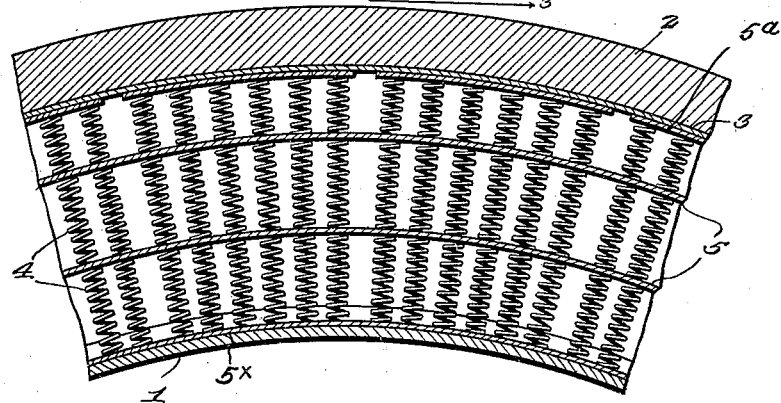
Figure 3 is a section on line 3—3 of Figure 2.

In these views 1 indicates a rim and 2 the casing or shoe which is supported by the rim. In carrying out my invention I replace the ordinary pneumatic tube by spring means, such means being placed in the casing. Figures 2 and 3 show these means as consisting of a steel lining 3 which is formed of spring metal so that it can give under the weight of the load. This lining fits within the casing, as shown, and has its edges terminating a short distance outwardly beyond the flanges of the rim. A plurality of coil springs 4 are arranged in series within the shoe. The series being separated by the annular plates 5, and outer spaced plates 5ª of arcuate shape in cross section are arranged between the groups of outer springs, Figure 3, and the lining 3. The inner and comparatively narrow series of springs is interposed between a channeled member 5ˣ on the rim and the inner plate 5. The springs are arranged in groups and they may be fastened to some of the plates, in any suitable manner in order to facilitate the assembling of the device. Where the clincher rim is used, the tire beads are forced in between the sides of the element 5ˣ and the bead of the rim with the ordinary tool now used for such purposes, or a circumferentially split rim of common construction can be used, or a laterally split rim may be used; the application of the tire on the wheel depending on the style of rim used.

From the foregoing it will be seen that the spring means and the plates 5 will act to give a cushion effect so as to take up shocks and jars incident to the movement of the vehicle along a road. The parts will be moved inwardly under the weight of the load, this movement being resisted by the springs, and the parts returned to normal position after they move away from the road surface.

It will also be seen that the side flanges of the channeled member 5ˣ serve to confine the inner ends of the inner series of springs, and that the plates 5ª of arcuate form in cross-section serve to confine the outer ends of the outer groups of springs, thereby holding the springs to their work and in that way contributing to the load-bearing quality of the tire.

I desire it to be understood that I may make changes in the construction and in the combination and arrangement of the several parts, provided that such changes fall within the scope of the appended claim.

What I claim is:—

A resilient tire comprising a shoe, a thin metallic lining of arcuate form in cross-section arranged within the outer portion of the shoe, an annular channeled member arranged between the inner edge portions of the shoe, spaced plates of arcuate form in cross-section arranged within the said lining and against the outer portion thereof, thin and resilient annular plates spaced apart and arranged within and in spaced relation to the lining, coiled springs interposed between said annular plates, groups of coiled springs interposed between the outer of said annular plates and the spaced plates of arcuate form in cross-section, and coiled springs interposed between the inner of the annular plates and the channeled member and confined by the flanges of said channeled member.

In testimony whereof I affix my signature.

GEORGE J. STILLMAN.